(12) United States Patent
Ball et al.

(10) Patent No.: US 8,190,626 B2
(45) Date of Patent: May 29, 2012

(54) COMPARING ANONYMIZED DATA

(75) Inventors: Catherine Nelson Ball, Washington, DC (US); Gary D. Forman, Oak Hill, VA (US); Elizabeth K Schroeder, Arlington, VA (US)

(73) Assignee: The Mitre Corporation, McLean, VA (US)

( * ) Notice: Subject to any disclaimer, the term of this patent is extended or adjusted under 35 U.S.C. 154(b) by 918 days.

(21) Appl. No.: 12/115,378

(22) Filed: May 5, 2008

(65) Prior Publication Data

US 2009/0276416 A1 Nov. 5, 2009

(51) Int. Cl.
*G06F 7/00* (2006.01)
*G06F 17/30* (2006.01)
(52) U.S. Cl. ........................................................ 707/765
(58) Field of Classification Search ................. 707/765, 707/999.006
See application file for complete search history.

(56) References Cited

U.S. PATENT DOCUMENTS

| | | | |
|---|---|---|---|
| 2004/0210763 A1 | 10/2004 | Jonas | |
| 2005/0044037 A1* | 2/2005 | Lawrence et al. | 705/38 |
| 2007/0239705 A1 | 10/2007 | Hunt et al. | |
| 2007/0260595 A1 | 11/2007 | Beatty et al. | |
| 2008/0104062 A1* | 5/2008 | Oliver et al. | 707/5 |
| 2009/0210418 A1* | 8/2009 | Arasu et al. | 707/6 |

OTHER PUBLICATIONS

IBM, IBM Relationship Resolution, http://www-306.ibm.com/software/data/db2/eas/relationship, Apr. 21, 2008, 2 pages.
IBM, Business Intelligence Breakthrough, http://www-306.ibm.com/software/info/features/dataprivacy, Apr. 21, 2008, 3 pages.

* cited by examiner

*Primary Examiner* — Kimberly Lovel
(74) *Attorney, Agent, or Firm* — Sterne, Kessler, Goldstein & Fox P.L.L.C.

(57) ABSTRACT

Systems, methods and computer program products for the comparison of anonymized data entries are described. In one embodiment the present invention is a computer-implemented method for comparing anonymized data entries, including separately processing data entries in a query list and a search database by: normalizing, generating variants, scoring, and anonyminizing. The expanded and anonymized data entries in the query list and the search database are then compared to find an exact match. In another embodiment, the present invention is a system for comparing anonymized data entries, having a list expansion module, an anonymizer module, and a matching module.

14 Claims, 5 Drawing Sheets

COMPARING ANONYMIZED DATA

BACKGROUND OF THE INVENTION

1. Field of the Invention

The present invention relates generally to comparing data entries in different lists, and more particularly to comparing anonymized data entries.

2. Background Art

Numerous situations require comparing a list of data entries against one or more other such lists. For example, such situations may include: airline security personnel matching a passenger list against a list of persons who are suspected of terrorist activity; a bank matching a mortgage applicant's name against a federal database of persons to whom lending is discouraged; and a health insurer checking applicants against a list of persons who are high-risk for receiving health insurance. The comparison process may include, for example, the comparing of names, dates of birth, nationalities or any combination of those or other personally identifying information.

In some applications, it may be desired that the list of query names and the database of names against which the query is run is privacy-protected, at least until a set of initially matching entries are received. For example, a third party private entity may perform the initial screening of numerous passenger lists against a federal terrorist watch-list. Privacy concerns may dictate that the identities of passengers and their personally identifiable data are withheld from the third party private entity. Likewise, it may be desired for security and privacy reasons to withhold the contents of the federal terrorist watch-list from the third party private entity. In this situation, the third party private entity may be required to compare a list of anonymized and/or encrypted names against the terrorist watch-list having anonymized and/or encrypted names. The third party private entity may, after having identified one or more potential matches, send the matching information to a government entity such as the Transportation Security Administration (TSA) that may conduct further investigations.

The comparing of personal information such as, for example, names, is made difficult by variations due to usage, cultural effects, transliteration effects, titles, spelling, inadvertent recording errors, etc. Therefore, many matching systems resort to fuzzy matching techniques, where entries with minor variations can be matched with an associated score that corresponds to the difference of the entry from the correct entry. Similar techniques are used to match other personally identifiable information alone or in combination with names.

However, when the names in the query list and the names in the search database are anonymized or encrypted, fuzzy or approximate matching is not feasible. Although the query word of "John Smit" may only differ in one letter from a database entry of "John Smith", the encrypted representations of these two names may not have any identifiable correspondence to each other. Therefore, when anonymized comparison is desired, it is generally required that an exact match is sought between a query list data entry and a search database data entry.

What is needed therefore, are systems and methods for accurate comparison of anonymized lists of data.

BRIEF SUMMARY OF THE INVENTION

The present invention is directed to system, method and computer program product embodiments for the comparison of anonymized data entries. In one embodiment, the present invention is a computer-implemented method for comparing anonymized data entries, including: normalizing a first data entry to generate a first normalized data entry; generating variants of the first normalized data entry, to generate one or more first variants; scoring each one of the one or more first variants to generate a corresponding first scored variant, wherein the first scored variant comprises the first variant and a first score; anonymizing each one of the one or more first scored variants to generate a corresponding anonymized first scored variant, wherein the anonymized first scored variant comprises an anonymized part and the first score; normalizing a second data entry to generate a second normalized data entry; generating variants of the second normalized data entry, to generate one or more second variants; scoring each one of the one or more second variants to generate a corresponding second scored variant, wherein the second scored variant comprises the second variant and a second score; anonymizing each one of the one or more second scored variants to generate a corresponding anonymized second scored variant, wherein the anonymized second scored variant comprises a anonymized part and the second score; and comparing the one or more anonymized first scored variants against the one or more anonymized second scored variants.

According to another embodiment, the present invention is a system for comparing anonymized data entries, including: a list expansion module, wherein the list expansion module generates one or more first variants of a first data entry; an anonymizer module, wherein at least one of the one or more first variants is anonymized to generate a corresponding first anonymized data entry; and a matching module that performs matching of the first anonymized data entry against a second anonymized data entry.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Figure 1:
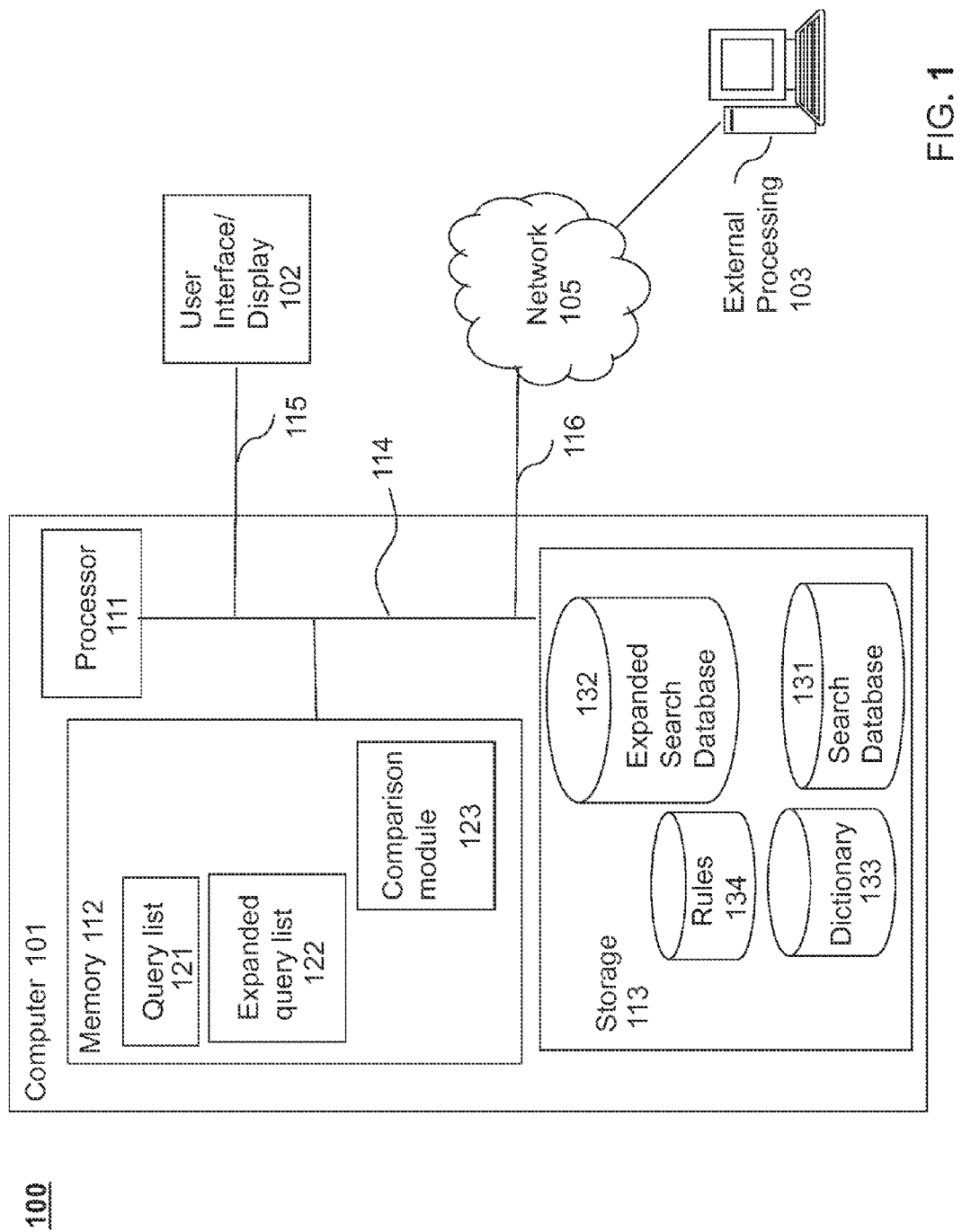
FIG. 1 is an anonymized list comparison system, according to an embodiment of the present invention.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION OF THE INVENTION

1. Overview

The present invention relates to the comparison of lists with anonymized data entries. While the present invention is described herein with reference to illustrative embodiments for particular applications, it should be understood that the invention is not limited thereto. Those skilled in the art with access to the teachings herein will recognize additional modifications, applications, and embodiments within the scope thereof and additional fields in which the invention would be of significant utility.

The comparison of a passenger list of an airline against a terrorist watch-list is a situation in which, for example, the embodiments disclosed herein may be used. The airline passenger list situation is used herein for illustrative purposes only, and is not intended to limit the present invention. In the airline passenger list situation, a private entity such as employees of the airline or the respective airports, may perform a preliminary screening of passengers against a terrorist watch-list or another derogatory list prior to the boarding of the aircraft. Information about persons flagged in this preliminary screening may be automatically transmitted to an external entity, for example, the Transportation Security Administration (TSA), for further investigation and processing. In this situation, for example, it may be desired that the private entity conducting the preliminary screening is prevented from having access to the personal information of passengers and also to the contents of the derogatory list. Therefore, the TSA may distribute the derogatory list in an anonymized form, processed according to an embodiment of the present invention, to the private entity. Likewise, the private entity can have access to a list of passenger records in an anonymized form processed according to an embodiment of the present invention.

In the following description, the term "query list" is used to describe query terms such as the airline passenger list in the above example, and the term "search database" is used to describe the list of data entries against which the queries are compared, such as the terrorist watch-list or other derogatory list in the above example. Each data entry to be compared may comprise multiple data elements. For example, a passenger record may contain the name, date of birth, address information, nationality, passport number, social security number, and/or other personal information. The data element name, such as, the name of a passenger in the above example, is used in the following description for illustrative purposes and should not be interpreted to limit the present invention. A person skilled in the art will understand that the teachings of this disclosure are applicable to all types of personally identifiable information.

Example embodiments for achieving comparison of anonymized lists according to the present invention are described in the following sections.

2. Composition of the Anonymized List Comparison System

FIG. 1 illustrates a system 100 according to an embodiment of the present invention. A computer 101 having control logic including the control logic for the comparison module 123, may be controlled by a user through a user interface/display 102. The user interface/display 102 may be connected to the computer 101 through any suitable connection mechanism 115 including Ethernet, IEEE 802.11, or a local connectivity device such as a Peripheral Component Interconnect (PCI) bus. The user interface/display 102 may be co-located with the computer 101, or be located separately and accessed through one or more networks. The user interface/display 102 may be a graphical user interface and may also be web-accessible. The user interface/display 102 may enable the input of data necessary for system operation, including but not limited to, data for the search database 131, for rules 134, for the dictionary 133, query list 121, and/or configuration parameters for the comparison module 123.

The computer 101 may be connected through any suitable connection mechanism 116 including Ethernet, and IEEE 802.11, to a separate external processing entity 103. The external entity 103 may receive, for example, information about matching data entries from the computer 101 and may conduct further investigations. In one embodiment, the anonymized entries from the expanded query list 122 and from the expanded search database 132 are forwarded to the external processing entity 103, for each pair matched data entries.

The computer 101 may represent one or more computers. In one embodiment, the computer 101 includes one computer in which all of the control logic processing takes place, including the expansion of the query list 121 and search database 131, the anonymizing of both lists, and the matching. In another embodiment, the computer 101 may include at least two computers, a first computer in which the query list 121 and the search database 131 are expanded and anonymized, and a second computer that accepts as input the expanded query list 122 and the expanded search database 132, and executes the control logic for matching between the two lists. In yet another embodiment, the computer 101 may include at least three computers: a first computer in which the expansion and anonymization of the query list 121 occurs, a second computer in which the expansion and anonymization of the search database 131 occurs, and a third computer in which the comparison between the two expanded lists occur. One or more of the computers comprising computer 101 may be a personal computer, a handheld computer, a personal digital assistant, or other device with computing capability. A person skilled in the art will appreciate that the computer 101 may represent multiple computers in which the functionality disclosed herein is distributed.

The computer 101 may include a processor 111, such as a central processor unit (CPU), a memory 112, and storage 113. It will be apparent to a person skilled in the art, that other components may be available and necessary for the operation of the computer 101 according to embodiments of the present invention. The processor 111, memory 112 and storage 113 may be connected by a internal bus such as, for example, a PCI bus 114. The bus 114 may also, for example, through network interface devices, facilitate connecting links 115 and 116 to the computer 101. The processor 111 may be any processor capable of executing control logic, including a general purpose CPU. The memory 112 may be a random access memory (RAM). The storage 113 may include one or more of a hard disk, flash memory or other form of permanent or semi-permanent digital data storage.

In one embodiment, the memory 112 may include control logic of the comparison module 123. The comparison module 123 may include all or part of the control logic required to accomplish the list comparison as taught herein. As noted above, the control logic of module 123 may be distributed over one or more computers according to embodiments of the present invention. The component modules of the comparison module 123 are described below in more detail with respect to FIG. 2.

The memory 112 may also include the query list 121 as originally received, for example, through the user interface 102, and an expanded query list 122 having entries processed according to an embodiment of the present invention. Depending on the embodiment of the present invention, the expanded query list 122 may or may not be anonymized in memory 112. In some embodiments, the memory 112 may also include all or part of the search database (not shown) in its original form prior to being processed according to an embodiment of the present invention, and/or all or part of the expanded search database (not shown).

The storage 113 may include a search database 131 and the corresponding expanded search database 132. For example, the search database 131 may be a derogatory list such as a terrorist watch-list, and the expanded search database 132 may be the search database 131 processed according to an embodiment of the present invention. Note that the term "database" herein means any list of data entries with or without an associated database framework or infrastructure. For example and without limitation, search database 131 may be an ASCII text file, or a table in a well known DBMS such as ORACLE. One or more rule collections 134 and one or more dictionaries 133 may be included in storage 113. The dictionary 133 may be used by the comparison module 123 in generating variants as described below, For example, dictionary 133 may be used to verify spellings and to identify alternatives to a given word. Rules 134 may also be used in the comparison module 123 in its different stages as described below. For example and without limitation, rules 134 may specify how each type of data element is to be normalized, types of element permutations for each type of data element, and how numeric scores are to he assigned to particular variants of each data type.

A person skilled in the art will understand that the various components shown in FIG. 1 is for illustration, and that there may be embodiments of the present invention that include fewer or greater components and in different arrangements, in accordance with the teachings of this disclosure.

Figure 2:
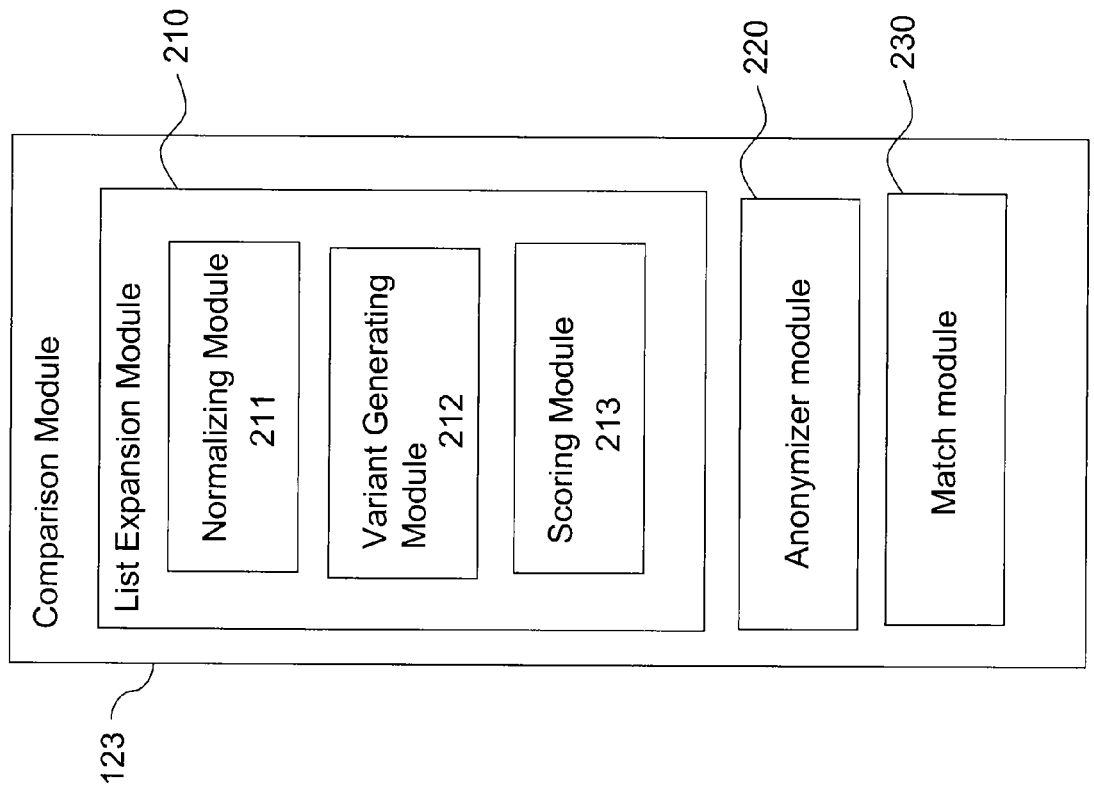
FIG. 2 shows component modules of the anonymized list comparison module according to an embodiment of the present invention.

FIG. 2 shows components of the comparison module 123. The comparison module 123 may include functionality to accept an input list such as a query list 121 or search database 131, expand and anonymize the input list, and perform comparison between two or more such expanded and anonymized lists. Accordingly, the comparison module 123, includes a list expansion module 210, an anonymizer module 220, and a matching module 230. The list expansion module 210 may further include a normalizing module 211, a variant generating module 212, and a scoring module 213. The constituent modules of the comparison module 123 may be co-located in a single computer, or may be distributed over multiple computers. For example, the list expansion module 210 and the anonymizer module 220 may be located on one computer and the match module 230 may be located on another. In another embodiment, a list expansion module 210 for the query list 121 may be located on one computer, a list expansion module 210 for the search database 131 may be located on a second computer, and the match module 230 may be located on a third computer. In yet other embodiments, the constituent modules of the list expansion module 210 may be distributed over one or more computers.

3. Method for Anonymized Comparison of Lists

Figure 3:
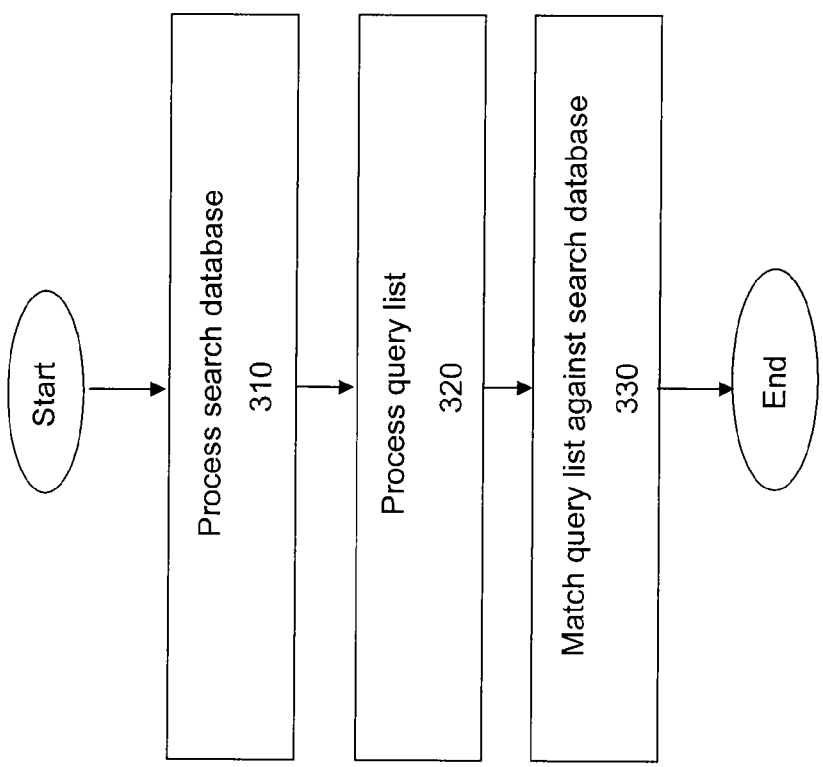
FIG. 3 is a flowchart illustrating the operation of the anonymized list comparison module, according to an embodiment of the present invention.

The flowchart 300 of FIG. 3 represents the processing within comparison module 123 according to an embodiment of the present invention. In the process search database step 310, the system (i.e., the comparison module 123) takes as input a database or derogatory list such as, for example, a federally maintained terrorist watch-list, and generates an expanded and anonymized search database 132. The process query list step 320 includes accepting a query list 121 having one or more entries, and generating an expanded and anonymized query list 122 in accordance with the teachings of this invention. In step 330, data entries in the expanded and anonymized query list 122 are compared against the data entries in the expanded and anonymized search database 132. Note that steps 310 and 320 are largely independent of each other and therefore may be performed separately in any order. For example, the creation of the expanded search database 132 in step 310 may be performed on a computer that is separate from the computer on which the expanded query list 122 is generated in step 320. However, note that in order to enable the matching step 330, steps 310 and 320 are required to have compatible methods of assigning numeric scores to variants and compatible methods of anonymization.

Figure 4:
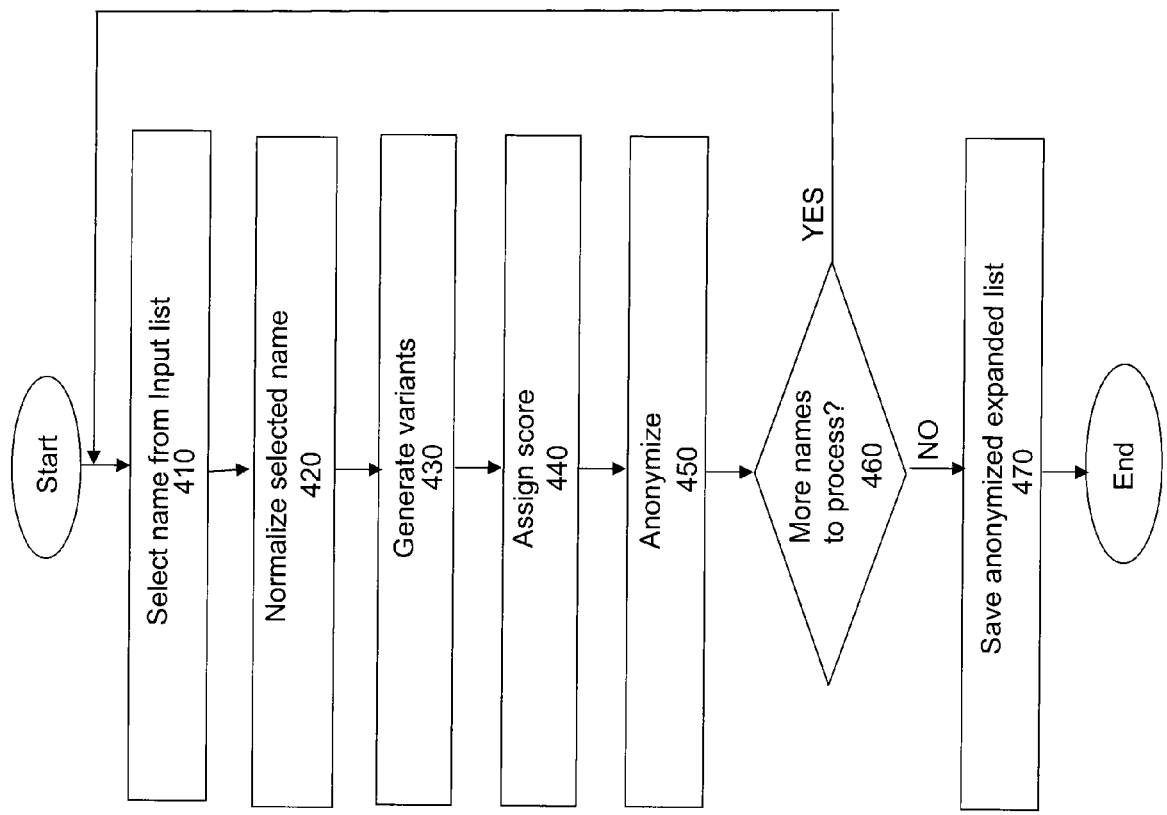
FIG. 4 illustrates in greater detail, the processing performed upon the search database or the query list, according to an embodiment of the present invention.

FIG. 4 is a flowchart 400 showing more detailed processing in steps 310 and 320 of FIG. 3. Specifically, steps 310 and 320 each comprise the steps of flowchart 400. It should be understood that flowchart 400 may be implemented separately to generate the expanded search database 132 and to generate the expanded query list 122. The input to the flowchart 400 may be a list of unprocessed data entries, for example, either the original query list 121 or the original search database 131, in part or in full.

For each unprocessed data entry, for example, a name selected in step 410, steps 420-450 are executed to generate expanded anonymized entries. Steps 410-460 can be repeated until at step 460 it is determined that there are no more names to process. The expanded anonymized entries may be saved to a memory location, a hard disk, or external storage, in step 470. The first step in processing each data entry is to normalize the data entry in step 420 as described in greater detail below. The normalization process enables some level of uniformity in the variant generation and scoring processes. The normalized data entry is then used for generating variants in step 430. Multiple variants may be generated for a data entry based on, for example, a dictionary 133, variant generation rules 134, and other criteria. Variant generation is addressed in greater detail below. In the assign score step 440, each of the variants generated are assigned a numerical score to indicate the derivational history of the variant as compared to the original data entry. Scoring is described in detail below. Each one of the variants with assigned scores are then submitted to the anonymizing step 450. In the anonymizing step 450, some means of anonymizing may be applied to all or part of each data entry to generate corresponding anonymized data entries.

Returning to FIG. 3, having performed steps 310 and 320 either locally or remotely and in any order, the expanded and anonymized query list 122 and the expanded and anonymized search database 132 are made available to the match step 330. In this step each entry in the expanded and anonymized query list 122 is compared against the entries in the expanded and anonymized search database 132 to find an exact match. If an exact match is found, the numeric scores assigned to each of the matching variants are considered to determine the confidence in each match.

Steps 420, 430, 440 and 450 are described in greater detail below, followed by a description of step 330.

3.1 Normalization (Step 420)

Normalization, as used herein, is the process of reforming a provided data entry in accordance with a standard that is specific to the type of data entry and/or the types of data elements contained within a data entry. For example, an airline passenger record data entry may include the data elements of name, date of birth, country of birth, citizenship, employment, etc. Normalization may require that the data entry and/or one or more of the constituent data elements be reformatted or restructured. In general, normalization facilitates the matching process by reducing variations in the data and/or by augmenting the data with a canonical form.

As examples of normalization, names of persons may be recorded as last name, first name, and middle initial, in that order; the first letter of each word may be required to be capitalized; unnecessary whitespace and unnecessary punctuation can be eliminated; and missing values and non-critical values may be coded with predetermined symbols. Dates of birth may be standardized to the American standard of month/day/year or the European standard of day/month/year. Alternatively, all dates may be standardized to one of ISO 8601 standards such as YYYY-MM-DD, where Y, M and D represents digits of year, month and date respectively. Address information may be standardized with predetermined codes for countries and states, formats for listing street names etc.

As another example, rules may be provided for normalizing data elements of names in one or more aspects in addition to the above: for example and without limitation, spellings, name parts and name structure. A variety of normalizations may be applied to spellings. For example, spelling variants of a name (e.g., Saml, Sameul, Samuell) can be mapped to standard forms (e.g., Samuel). Standardization can also be applied to transliteration. The application of such standards can greatly reduce the variation that may otherwise occur. For example, while more than a 100 ways of writing can be found for Muhammad, the Intelligence Community Standard for the Transliteration of Arabic Names yields only one spelling for the Arabic version of this name.

The representation of name parts such as Mac, Mc, von, van der, de, bin al, etc., can also be standardized. Name parts, where available, may be hyphenated in cases, such as, for example, Hispanic names having matronymic and patronymic components or Korean names having two-syllable given names. Structure may be explicitly represented by, for example, capitalizing the last name component. Other forms of normalization, including the conversion of all or predetermined parts of the data entry to a universal representation such as a Soundex code, may also be usable.

Rules and dictionaries may be utilized to aid in the process of normalization in step 420. For example, a dictionary 133 may specify all of the different ways of spelling a particular word so that it can be normalized to a single representation. Rules 134 may be used to recognize the origins or ethnicity of a name, and to process or arrange the name parts accordingly to represent in a normalized form. Rules 134 may also be used to recognize phrases used as titles in names, for example, so that they can be removed for purposes of normalizing.

3.2 List Expansion (Step 430)

Subsequent to the normalization step 420, each data entry may be individually subjected to expansion. In an embodiment of the present invention, list expansion is performed both on the search database 131 and the query list 121 to increase the accuracy of the comparison system 123. The fact that a query list 121 data element (such as name having the parts of first name, middle name and last name) may have more or less parts than the search database 131 data elements, may require multilateral variant generation as taught herein. For example, consider a situation where the query list 121 contains all three parts of name, while the search database 131 contains only the first name and last name parts. Then, either the middle name in the query list 121 must be dropped prior to matching, or a variant having the correct middle name must be generated in the search database 131. The middle name, however, is not predictable based on the rest of the name parts. Therefore, dropping of the middle name is required in the query list 121. Similarly, in the situation where the search database 131 contains all three parts of name, while the query list 121 contains only the first name and last name parts, dropping of the middle name may be required in the search database 131. Like the generation of variants having name part reductions in the above example, several other variants may need to be generated on both the query list 121 and the search database 131. The expansion of a data entry may be based on the expansion of one or more of the constituent data elements of the data entry. For example, considering a name, variant generation may lead to enumerating forms the name might take.

Variant generation in step 430 may include, for example, concatenation of name parts, segmentation of names, expansions of truncated names, nicknames and aliases corresponding to name parts, variants corresponding to common typographical errors, expansion of initial or contraction to initials, and spelling variants where normalization may not be not adequate. Also, translation variants may be generated to address situations such as, for example, Yusif, Iosef, Josep, Giuseppe and Joseph all being versions of the same biblical name, and a targeted individual appearing with one of the translation variants of his real name. Variant generation may also require the generation of variants with one or more name parts noted as missing, for example, through standardized codes such as LNU (last name unknown) and FNU (first name unknown). Rearranging of name parts in various permutations may also be used in variant generation.

In some embodiments, only selected types of variants may be generated in either the query list 121 or the search database 131. For example, one embodiment of the present invention may generate query list 121 variants that correspond only to redaction of name parts, while performing all other variant generation on the search database 131. A person skilled in the art will understand that the variant generation may be coordinated between the query list 121 and the search database 131 in a number of ways including the above. The teachings disclosed herein may enable the variant generation process to be tailored and distributed in a manner suitable for different applications considering the available processing resource, time constraints, and accuracy requirements. The teachings herein also enables configuring the normalization module 211 and the variant generating module 212 to complement each other. For example, stricter and more complete normalization rules for spelling of names, if applied to both the query list 121 and to the search database 131, may eliminate the need to generate spelling variants of the same names.

Rules 134 and dictionaries 133 may be used in the variant generation step 430. For example, rules 134 may define how candidates for concatenation and segmentation can be identified through text analysis, the types of names that call for permutation based variant generation, the types of names that require variants with missing name parts duly noted, transliteration rules based on origin or ethnicity of name, etc. Dictionaries 133 may, for example, be used for generating spelling variants, and for recognizing names with translation variants.

3.3 Scoring (Step 440)

In some embodiments of the present invention, a numerical score to is attached to each variant that is generated. The scoring module 213 in step 440 considers each variant and assigns a score. The score may be assigned separately to each data element within a data entry, and/or may be assigned as an aggregated score for the data entry considering a set of the data elements. Although it is preferred that a score is attached to each variant on both the expanded query list 122 and also on the expanded search database 132, embodiments of the present invention may assign scores to all or some entries on either or both the expanded query list 122 and the expanded search database 132.

The numerical score attached to each variant is a measure of the derivational history of that variant. After an exact match, the system then examines the derivational history of the expanded query list 122 variant and the derivational history of the search database 132 variant. This information is then used to eliminate certain matches based on their history. For example, "John Smith" in the expanded query list 122 matches "John Smith" in the search database 132, but the match may not be considered sufficiently reliable if the variant in the expanded query list 122 was derived from "John A. Smith" and the variant in the expanded search database 132 was derived from "John B. Smith", both by deletion of middle name part.

The rules 134 may include rules for assigning scores based on derivational history. For example, rules 134 may define a particular score for deleting the middle name to arrive at a variant. In deriving variants, the various scores applicable to each type of derivation may be aggregated, or combined in a predetermined way. It is noted that for a given application, the score assignment process must be done uniformly on the expanded query list 122 and on the expanded search database 132.

3.4 Anonymizing (Step 450)

The variants generated in the expanded query list 122 as well as the variants generated in the expanded search database 132 can be anonymized using the anonymizer module 220. The anonymizing step 450 must be implemented both on the expanded query list 122 and on the expanded search database 132, using the same anonymizing algorithm and parameters, so that exact matches in un-anonymized form between the expanded query list 122 and the expanded search database 132 will remain exactly matched in their corresponding anonymized forms.

All or only some of the data elements of a data entry may be anonymized. For example, in a airline passenger records and in the corresponding derogatory list, it may be deemed sufficient to anonymize only the name and nationality of each individual. The teachings herein are applicable to situations where all or some of the data elements in a data entry are anonymized. Note however, that the score assigned for the variant's derivational history is not anonymized.

Many methods of anonymization may be implemented according to the teachings of the present invention. For example, simple transcoding to obfuscate data elements, or cryptographic methods such as MD5 encryption may be utilized. The teachings herein do not require a specific method of anonymization.

3.5 Anonymized Matching (Step 330)

The anonymized data entries of the expanded query list 122 are matched against the anonymized data entries of the expanded search database 132 using the match module 230 in the matching step 330. Prior to matching, both the expanded query list 122 and the expanded search database 132 is expanded by the addition of variants, and is then anonymized. In some embodiments, both or one of the expanded query list 122 or expanded search database 132 may have been normalized. In some embodiments, data entries in both or one of the expanded query list 122 or expanded search database 132 may have been assigned numerical scores based on derivational history.

Having anonymized entries makes it essential that an exact match comparison is made between the entries. The encrypted representation of two data elements having only a slight difference may have no discernible correspondence to each other. For example, the MD5 hash function may yield "0c1faa267b080e618bc183492d28329c" for "Mohamed Bin Ahmed HOSEIN", and "4d5efd45aac1dd0c1b7cb7113dc5f95a" for "Mohammed Bin Ahmed HOSEIN". The variant generation 430 and the normalization 420 may be designed to generate all reasonable variants of a data entry so that exact matching is made possible. The efficiency of the matching process is to some extent dependent on the number of variants generated and the processing resources available.

The exact match process itself is fast and efficient because it is a direct string comparison. Where an exact match occurs, the derivational history scores, where available, may be considered in determining if a match is valid. The derivational history scores may be used as a measure of confidence in each match, based on the type of variant that is matched.

In another embodiment of the present invention, applications may set a threshold for the derivational history scores of matching variants above which the corresponding matches are considered valid. Matches having variants with scores above the threshold may be considered sufficiently reliable to be processed further.

4. Example Computer Embodiment

Figure 5:
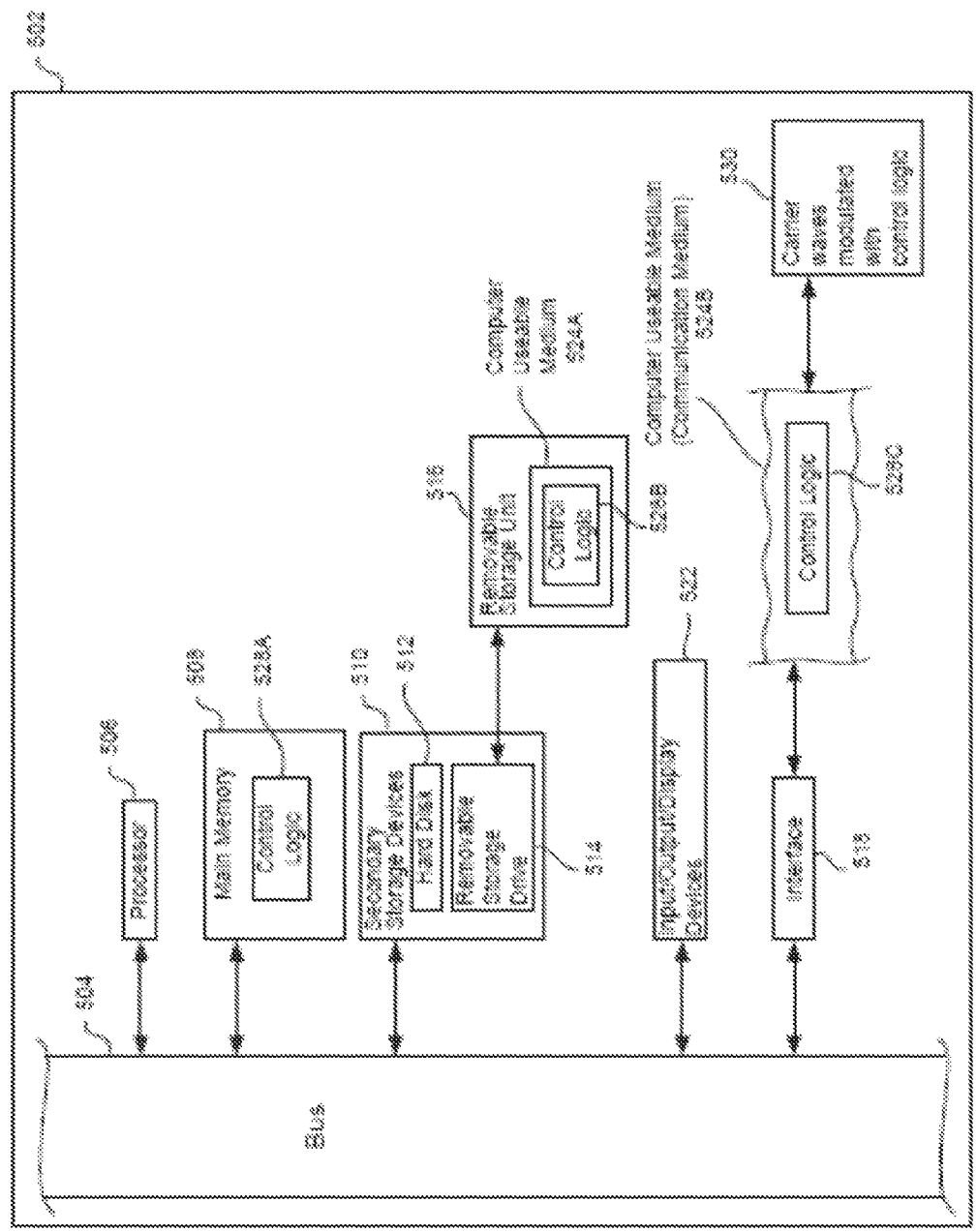
FIG. 5 illustrates an example computer embodiment of the present invention.

In an embodiment of the present invention, the system and components of the present invention described herein are implemented using well known computers, such as computer 502 shown in FIG. 5. For example, comparison module 123 can be implemented using computer(s) 502.

The computer 502 includes one or more processors (also called central processing units, or CPUs), such as a processor 506. The processor 506 is connected to a communication bus 504.

The computer 502 also includes a main or primary memory 508, such as random access memory (RAM). The primary memory 508 has stored therein control logic 528A (computer software), and data.

The computer 502 may also include one or more secondary storage devices 510. The secondary storage devices 510 include, for example, a hard disk drive 512 and/or a removable storage device or drive 514, as well as other types of storage devices, such as memory cards and memory sticks. The removable storage drive 514 represents a floppy disk drive, a magnetic tape drive, a compact disk drive, an optical storage device, tape backup, etc.

The removable storage drive 514 interacts with a removable storage unit 516. The removable storage unit 516 includes a computer useable or readable storage medium 524 having stored therein computer software 528B (control logic) and/or data. Removable storage unit 516 represents a floppy disk, magnetic tape, compact disk, DVD, optical storage disk, or any other computer data storage device. The removable storage drive 514 reads from and/or writes to the removable storage unit 516 in a well known manner.

The computer 502 may also include input/output/display devices 522, such as monitors, keyboards, pointing devices, etc.

The computer 502 further includes at least one communication or network interface 518. The communication or network interface 518 enables the computer 502 to communicate with remote devices. For example, the communication or network interface 518 allows the computer 502 to communicate over communication networks or mediums 524B (representing a form of a computer useable or readable medium), such as LANs, WANs, the Internet, etc. The communication or network interface 518 may interface with remote sites or networks via wired or wireless connections. The communication or network interface 518 may also enable the computer 502 to communicate with other devices on the same platform, using wired or wireless mechanisms.

Control logic 528C may be transmitted to and from the computer 502 via the communication medium 524B. More particularly, the computer 502 may receive and transmit carrier waves (electromagnetic signals) modulated with control logic 530 via the communication medium 524B.

Any apparatus or manufacture comprising a computer useable or readable medium having control logic (software) stored therein is referred to herein as a computer program product or program storage device. This includes, but is not limited to, the computer 502, the main memory 508, secondary storage devices 510, the removable storage unit 516 and the carrier waves modulated with control logic 530. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

5. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for comparing anonymized data entries, comprising:
   (a) accessing a first list having a plurality of anonymized first entries, wherein an anonymized first entry includes a first part and a first score, and wherein the first part is anonymized;
   (b) accessing a second list having a plurality of anonymized second entries, wherein an anonymized second entry includes a second part and a second score, and wherein the second part is anonymized;
   (c) detecting an exact match between the first part and the second part; and
   (d) determining validity of said match based on a comparison of the first score and the second score to a threshold, wherein the first score is based on derivational history of the first part, and wherein the second score is based on derivational history of the second part.

2. The computer-implemented method of claim 1, wherein step (a) comprises:
   normalizing a first data entry to generate a first normalized data entry;
   generating variants of the first normalized data entry, to generate at least one first variant;
   scoring the at least one first variant to generate a first scored variant, wherein the first scored variant comprises the first variant and the first score; and
   anonymizing the first scored variant to generate the anonymized first entry.

3. The computer-implemented method of claim 2, wherein the step of generating variants comprise at least one of the following steps:
   generating variants based on transliteration;
   generating variants based on translation;
   generating variants based on segmentation of words;
   generating variants based on combination of words;
   generating variants based on common typographical errors;
   generating variants based on spelling variations; and
   generating variants based on known variations in name parts.

4. The method of claim 2, wherein the scoring comprises:
   identifying a variation between the first data entry and the first variant;
   finding a rule corresponding to the variation from a plurality of predefined rules; and
   assigning the first score based upon the found rule.

5. The method of claim 4, wherein the scoring further comprises:
   assigning the first score based upon aggregating scores corresponding to respective ones of a plurality of variations between the first data entry and the first variant.

6. The computer-implemented method of claim 1, wherein step (b) comprises:
   normalizing a second data entry to generate a second normalized data entry;
   generating variants of the second normalized data entry, to generate at least one second variant;
   scoring the at least one second variant to generate a second scored variant, wherein the second scored variant comprises the second variant and the second score; and
   anonymizing the second scored variant to generate the anonymized second entry.

7. The method of claim 1, further comprising:
   determining the validity of the match based further upon a derivational history of a first variant and a second variant, wherein the first part comprises the first variant anonymized, wherein the derivational history of the first part represents a difference between the first variant and a first data entry from which the first variant is derived, wherein the second part comprises the second variant anonymized, and wherein the derivational history of the second part represents a difference between the second variant and a second data entry from which the second variant is derived.

8. The method of claim 1, wherein the match is an exact match.

9. The method of claim 1, wherein determining the validity, comprises comparing the first score and the second score to a threshold.

10. A system for comparing anonymized data entries, comprising:

a processor;

a list expansion module configured to be executed on the processor, and to generate one or more first variants of a first data entry and a first derivational score associated with each of the one or more first variants;

an anonymizer module configured to be executed on the processor, and to anonymize at least one of the first variants to generate a corresponding first anonymized data entry; and a matching module configured to be executed on the processor, and to detect a match between the first anonymized data entry and a second anonymized data entry, wherein detecting the match includes (i) determining an exact match between the anonymized first variant and an anonymized second variant, and (ii) comparing of the first derivational score and a second derivational score associated with the anonymized second variant to a threshold.

11. The system of claim 10, wherein the list expansion module comprises a normalizing module configured to be executed on the processor, and to normalize the first data entry.

12. The system of claim 10, wherein the list expansion module further comprises a scoring module configured to determine the first derivational score based upon a difference between the first variant and the first data entry.

13. A tangible computer readable storage medium storing instructions wherein said instructions when executed cause at least one processor to compare anonymized data entries using a method comprising:

(a) accessing a first list having a plurality of anonymized first entries, wherein an anonymized first entry includes a first part and a first score, and wherein the first part is anonymized;

(b) accessing a second list having a plurality of anonymized second entries, wherein an anonymized second entry includes a second part and a second score, and wherein the second part is anonymized;

(c) detecting an exact match between the first part and the second part; and (d) determining validity of said match based on a comparison of the first score and the second score to a threshold, wherein the first score is based on derivational history of the first part, and wherein the second score is based on derivational history of the second part.

14. The computer readable medium of claim 13, wherein step (a) comprises:

normalizing a first data entry to generate a first normalized data entry;

generating variants of the first normalized data entry, to generate at least one first variant;

scoring the at least one first variant to generate a first scored variant, wherein the first scored variant comprises the first variant and the first score; and anonymizing the first scored variant to generate the anonymized first entry.

* * * * *